Figure 1:
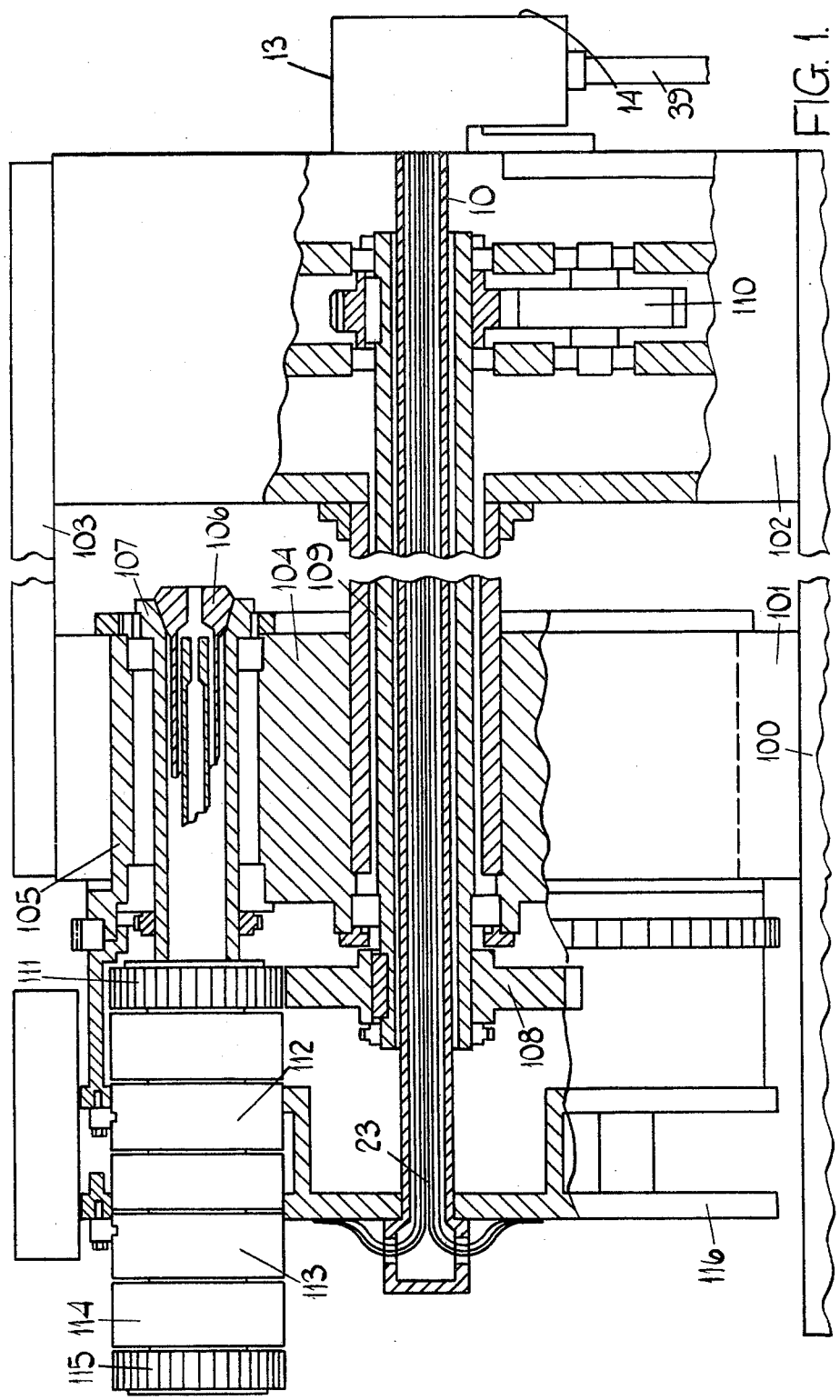

United States Patent [19]

McConnell et al.

[11] 4,100,825
[45] Jul. 18, 1978

[54] CONTROLS FOR MULTI SPINDLE LATHES

[75] Inventors: Edmund Alexander McConnell, Coventry; Norman Yearsley, Kenilworth; Alec Gordon Blockley, Coventry, all of England

[73] Assignee: Wickman Machine Tool Sales Limited, Coventry, England

[21] Appl. No.: 748,349

[22] Filed: Dec. 7, 1976

[30] Foreign Application Priority Data

Dec. 13, 1975 [GB] United Kingdom ............... 51170/75

[51] Int. Cl.² .............................................. B23B 3/34
[52] U.S. Cl. ............................................................ 82/3
[58] Field of Search ............................................ 82/3

[56] References Cited

U.S. PATENT DOCUMENTS

| 3,063,131 | 11/1962 | Fenn | 82/3 |
| 3,722,048 | 3/1973 | Schubert | 82/3 |
| 3,826,161 | 7/1974 | Simonin et al. | 82/3 |
| 3,828,901 | 8/1974 | Flueckiger | 82/3 |

FOREIGN PATENT DOCUMENTS 2,457,477  6/1975  Fed. Rep. of Germany ............ 82/3

Primary Examiner—Harrison L. Hinson
Attorney, Agent, or Firm—Ladas, Parry, Von Gehr, Goldsmith & Deschamps

[57] ABSTRACT

A multi spindle automatic lathe having electrically actuated units on respective spindles in an indexable drum, and having a rotary electrical switch with multiple poles, the switch having a rotatable part indexable with the drum and carrying contacts connected by wiring to the respective units on the spindles, the switch also having a part fixed to the base of the lathe, said fixed part having contacts connected to wiring to control circuits.

14 Claims, 4 Drawing Figures

CONTROLS FOR MULTI SPINDLE LATHES

This invention relates to controls for multi spindle lathes.

Such lathes have their work spindles mounted in an indexable drum which brings successive spindles into positions for machining operations to be carried out on work pieces held in chucks carried on the respective spindles. On the drum rried out on work pieces held in chucks carried on the respective spindles. On the drum and associated with the spindles there are various controls such as speed selection clutches, brakes, chuck actuators and other devices, at least some of which are electrically actuated. On large and complex lathes there may be a great many electrical devices to be operated and it may be necessary in particular to provide for several electrical devices to be electrically actuated or to be capable of actuation electrically, for each indexed position of the drum.

It is known to provide a rotary electrical commutator like device for this purpose, on a multi spindle lathe but in such known commutator devices, it is impractical to provide control for a large number of circuits, for reasons such as size limitations for the commutator device.

It is the object of this invention to provide a multi spindle lathe with convenient means for controlling multiple electrical connections to the spindle drum.

According to the invention a multi spindle lathe is characterised by a multi position, multi pole rotary electrical switch associated with a drum in which the spindles are mounted and which is indexable between a number of finite positions, the switch being arranged to control multiple electrical circuits to the drum, and the switch having a fixed part and a relatively rotatable part having equal numbers of co-operable contacts respectively, the fixed part being fixed relatively to a base of the lathe and the rotatable part being indexable with the drum, and selection of any one of the possible positions of the switch providing simultaneous connection between a number of said co-operable contacts.

The rotatable part of the switch is fixed to the spindle drum of the lathe and is indexed with it, but multiple circuits may be made operative at each of the positions. This involves selection of the circuits through a further device which may for example be a programmer device.

The invention resides also in a multi position, multi pole rotary electrical switch as set forth in the preceding paragraphs.

Figure 2:
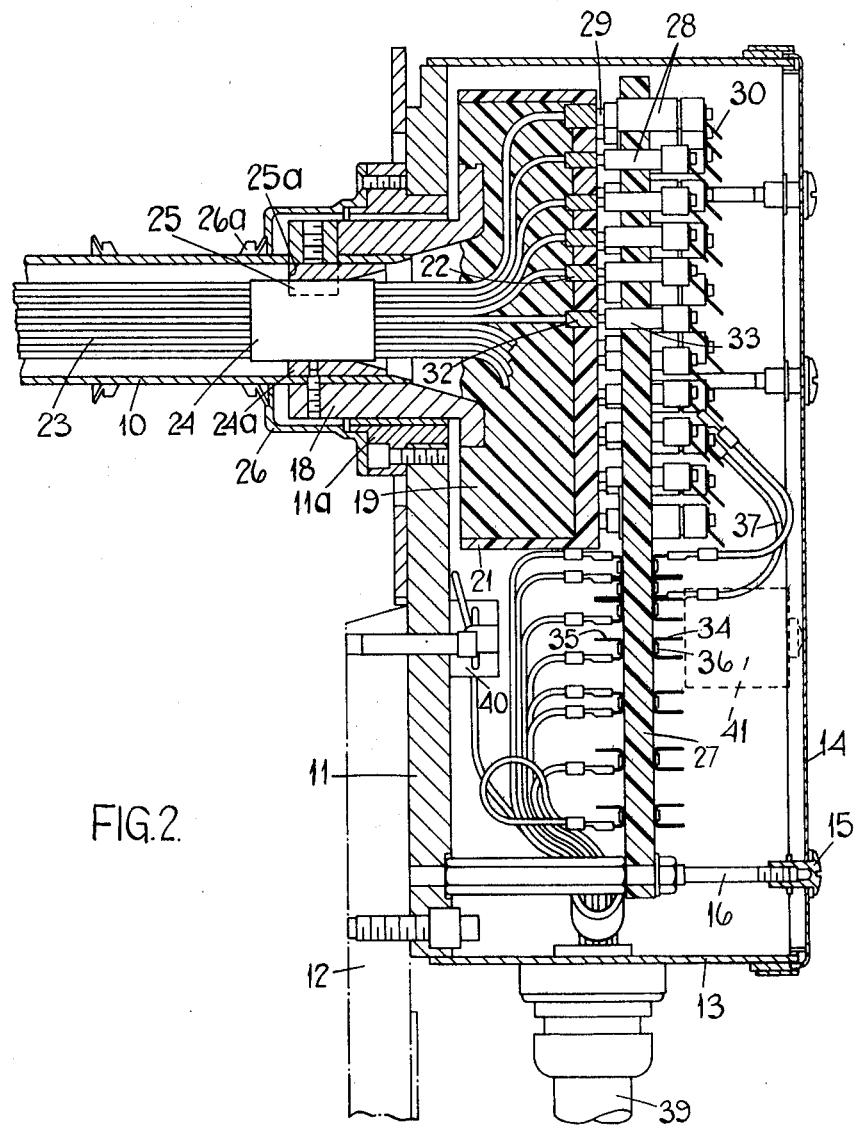
Figure 3:
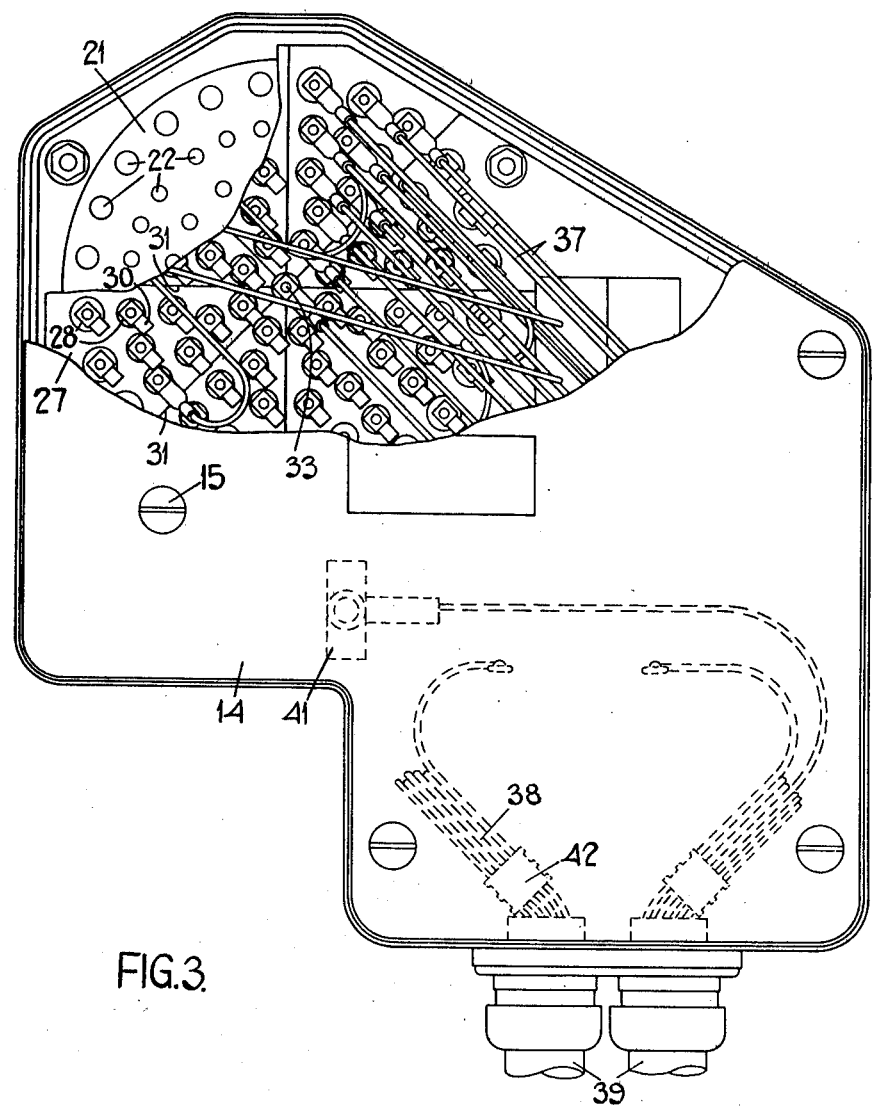
Figure 4:
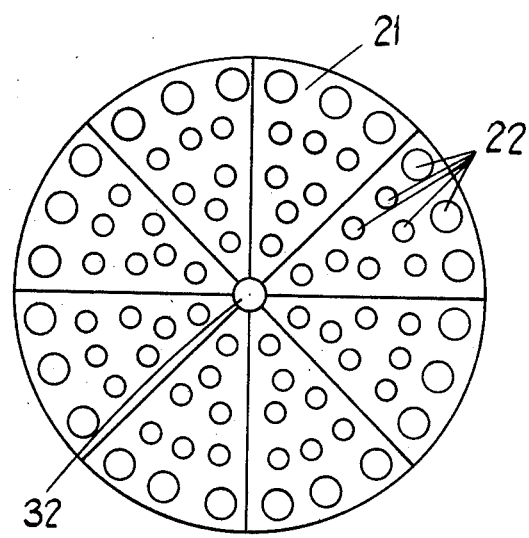

The invention will now be described by way of example, with reference to the accompanying drawings in which:

FIG. 1 is a diagrammatic representation of a multi spindle lathe constructed in accordance with the invention, FIG. 2 is a side elevation cross sectional view of a rotary switch constructed in accordance with the invention and shown in the machine, FIG. 3 is a partly broken away end view of the switch and FIG. 4 is a view of the rotatable part of the rotary switch.

The multi-spindle lathe shown in FIG. 1 has a base 100. On this are two superstructures 101 and 102, joined by a bridge structure 103. One of these is a superstructure in the form of a drum housing 101 in which is indexably mounted, about a horizontal axis, a spindle drum 104. Journalled in the drum 104 are a plurality of work spindles 105 rotatable about parallel horizontal axes. Each includes a chuck having inner and outer parts 106, 107. For rotating the work spindles a gear 108 is journalled in the centre of the drum 104 on a tubular spindle 109 which extends co-axially right through the drum and across the space between the two superstructures 101, 102 and into the superstructure 102. Within this is a gear train indicated generally at 110 for driving the spindle 109. The gear 108 meshes with respective gears 111 on each of the work spindles. However, the gear 111 on each such work spindle is engageable with its work spindle through an electro magnetic clutch 112. Furthermore, an electro magnetic brake 113 is provided on each work spindle to stop the spindle in the drum when required. There is on each work spindle a further clutch 114 which can engage the spindle to a further gear 115 for driving the spindle at an alternative speed. This gear 115, in turn, is driven by a further train of gears (not shown) connecting with the central hollow spindle 109. Partially enshrouding the clutches and brakes of the work spindles is an extension 116 secured to the drum 104.

Secured to the drum extension 116 is a tube 10 which passes through the hollow interior of the central spindle 109 to the opposite end of the lathe. The tube 10, which indexes with the drum 104 contains wiring indicated at 23, leading to the clutch and brake assemblies on the respective work spindles of the machine. Wiring within the tube 10 also leads to other electrically actuated or actuable devices on or associated with the spindles within the drum. Such a lathe is described and claimed in pending Patent Application No. 56565/73.

At the extremity of the tube 10 there is a rotary switch which is illustrated in FIGS. 2, 3 and 4 of the drawings. This has a composite housing comprising a base plate 11 secured to a fixed part 12 of the machine. Welded to the base plate 11 is a wall 13 of the housing, on which in turn is carried a detachable cover 14 of the housing. The cover is secured by hollow nuts 15 engaging the studs 16 which are fastened in the base plate 11.

The switch comprises two parts, a relatively rotatable part and a fixed part having respective sets of complimentary poles as will be described.

The rotatable part is a composite assembly in which are secured a plurality of separate contacts or poles 22. The contacts are of electrically conducting material and they are embedded in electrically insulating material. The assembly comprises a metal flanged bush 18, a moulded resin case 21 and an epoxy resin filler 19, the contacts 22 being moulded in the case 21. The assembly is secured to the tube 10, the bore of the bush 18 fitting on the outer diameter of the tube 10. The bush 18 is keyed to the tube 10 by a cap 25 which fits into a slot 25a in the tube 10.

The contacts 22 which are arranged in a plurality of circular rows, are connected to the wiring 23 which extends into and through the hollow tube 10. The wiring is enclosed in a sleeve 24 which in turn is located in a bush 24a which ensures that the wires do not flex in the tube 10.

FIG. 4 shows the face of the rotatable part presented to the fixed part. It can be regarded as having eight segments corresponding with the eight spindles of the machine. In each segment are ten contacts comprising two sets of three contacts in the outermost circle of contacts, and in the next circle to the next inner circle is a pair of contacts and in the next two rows inwardly are one contact each. One contact is in the centre at 32.

Some of the contacts carry power supplies to the various functions, such as clutch and brake units and other devices. The other contacts are provided for transmitting electrical signals to provide control for the various functions. The power is preferably at higher voltage than that of the signals.

The rotatable part of the switch is supported by a bearing sleeve 11a surrounding the bush 18 and which is secured to the base plate 11 of the housing. A cover 26 with a seal 26a is fixed to the bearing sleeve to prevent ingress of foreign matter and oil to the assembly.

The fixed part of the switch is supported on the studs 16, which also serve to engage the nuts 15 for the detachable cover 14. The fixed part is in the form of a plate 27 formed from an electrically insulating material. This plate carries a plurality of spring loaded brushes 28. Each such brush has a tubular mounting secured in the plate 27 and extending out of one end a spring loaded brush proper 29. The other end of the brush carries a terminal tag 30.

There are the same number of brushes 28 as contacts 22 and in any of the predetermined angular indexed positions of the switch, corresponding with indexed positions of the spindle drum of the machine, all contacts 22 co-operate with corresponding brushes 28.

The plate 27 is not circular but corresponds approximately in shape to that of the housing, but the area in which the brushes 28 are fitted corresponds with the rotatable part of the switch and this area is, in consequence, circular. Lines 31 on the face of the plate 27 remote from the rotatable part indicated the zones represented by each of the segments. In this construction there are the eight identical segments, as there are the eight spindles in the associated machine and each segment contains ten contacts and corresponding brushes. Thus in each segment the rotatable part of the switch can provide for actuation of mechanisms associated with each spindle, whilst the fixed part and its brushes represent the choice of said mechanisms that may be engaged at the position corresponding to each particular segment. A further brush 33 is situated in the centre of the assembly to engage the centre contact 32.

The plate 27 has, at a position offset from the area containing the brushes 28, a connector portion having a plurality of connector tabs 34, 35 connected in pairs through rivets 36 to opposite sides of the plate 27 respectively. To the tabs 34 may be connected wires 37 which in turn connect with respective tabs 30 on the brushes 28. Thus by connecting appropriate brushes 28 to particular tabs 30, a choice of spindle functions may be programmed.

The tabs 35 are connected to wiring 38 from an input conduit 39 entering the side wall 13 of the casing. The wiring 38 is connected with a control unit (not illustrated) which provides electrical signals for actuating the clutch and brake machanisms and also other mechanisms in the machine tool such as for location of a work spindle in an angular position, which may also be electrically actuated through the rotary switch.

The contact 32 and corresponding brush 33 engaging with it, in the centre of the switch, has the function of a return line for the lower voltage signals, being common to several of them.

The casing also serves as a carrier for additional electrical contacts on a block 40 leading to a safety interlock switch 41 the input also reaching the switch through the input conduit 39.

The switch 41 within the casing is of the plunger type and is attached to the wall 13 thereof, the plunger engaging with the detachable cover 14. When the latter is removed, the switch 41 is opened, thus isolating electrical supply from the rotary switch and preventing operating of the machine.

The input conduit 39 is divided as shown in FIG. 2 and the bunches of wires which enter the casing are clamped by means of clamps 42.

By means of the apparatus shown a plurality of functions can be controlled in each indexed position of the machine and special functions, such as selection of particular angular setting of a single spindle, can be achieved while other functions are being carried out on others of the spindles.

In an alternative construction, the number of contacts 22 and of corresponding brushes 28 is reduced to a minimum of three per spindle (clutch, brake and return). Such contacts may occupy one or two rows. Other combinations are possible but in all cases the contacts are all simultaneously connected with respective brushes at predetermined finite angular positions of the switch. Since the rotatable part of the switch is connected to the spindle drum, it is not possible for the switch to occupy a position intermediate one of the predetermined finite positions. To prevent arcing as the contacts move relative to the brushes the electric circuit is broken before indexing and restored after indexing.

Since the contacts in each segment are arranged in rows, at least some of which contain more than one, such as three or two as shown, it is essential that the electrical supply should be cut off before indexing in order to prevent incorrect functioning by electrical connection between contacts and brushes not designed to be interconnected. For example, the three outer contacts comprise forward, reverse and return for an electric motor. If the forward contact is energised, it must not touch the brush for reverse and so on.

In a further alternative construction tabs 34 and 35 are omitted and brushes 28 and 33 may be connected to an external control box where the spindle functions can be selected by switches, dials or other devices.

We claim:

1. A multi spindle lathe comprising:
    a machine base;
    a spindle drum mounted on the machine base;
    drive means for indexing the spindle drum with respect to the machine base about an index axis in equal steps of $m/360°$, where $m$ is a finite integer greater than unity, whereby the spindle drum is brought in succession into $m$ different index positions;
    $n$ spindles, where $n$ is a finite integer greater than unity and not greater than $m$, the spindles being mounted in the spindle drum and defining respective spindle axes which are all in the same orientation with respect to the index axis, and each pair of spindles which are adjacently disposed about the index axis being angularly spaced about the index axis by an angle which is an integral multiple of $m/360°$;
    a plurality of electrical circuits associated with the spindle drum; and
    a multi pole rotary electrical switch for controlling said electrical circuits and having a part which is fixed with respect to the machine base and a part which is rotatable with respect to the machine base about a switch axis and is arranged to index about said switch axis in synchronism with the spindle drum, whereby the rotatable part is brought in succession into $m$ different index positions about said switch axis, the fixed and rotatable parts each having m.p cooperable contacts thereon, where p is a finite integer greater than unity, said contacts being arranged in the fixed and rotatable parts in respective circular arrays centered on the switch axis, each array being made up of $m$ arcs subtending equal respective angles at the switch axis and each arc including p contacts, the contacts of each arc being similarly disposed so that at each of the $m$ index positions of the spindle drum the contacts of the fixed part engage respective contacts of the rotatable part for controlling the electrical circuits respectively.

2. A multi spindle lathe as claimed in claim 1 in which the contacts on the rotatable part are connected to wiring leading to electrically actuated units in the drum and associated with the spindles therein respectively, the lathe further comprising a control means which provides selective electrical signals for actuating said units in the drum, and the contacts of the first part of the switch being optionally connectible with wiring from said control means.

3. A multi spindle lathe as claimed in claim 2 in which the contacts on the fixed part of the switch are connectible to the wiring through respective detachable terminals.

4. A multi spindle lathe as claimed in claim 2 in which the fixed part of the switch includes a plate on which the contacts of that part are mounted, the wiring optionally connectible thereto being connected through further detachable connections.

5. A multi spindle lathe as claimed in claim 4 in which the further detachable connections include terminals also mounted on the plate.

6. A multi spindle lathe as claimed in claim 1 in which the contacts on one of said parts of the switch are plungers and those on the other part are fixed contact with which the plungers make contact when the switch occupies any one of the different index positions thereof.

7. A multi spindle lathe as claimed in claim 1 in which the switch is housed in a casing which is provided with a removable lid, a switch being provided to disconnect electrical supply to the contacts when the lid is removed, to prevent operation of the machine.

8. A multi spindle lathe as claimed in claim 1 in which said fixed and rotatable parts of the rotary switch each have m further cooperable contacts thereon, said further contacts being arranged in the fixed and rotatable parts in respective circular arrays of different diameter from the circular arrays formed by said m.p cooperable contacts, the contacts of each circular array of m contacts being spaced equiangularly about said switch axis so that at each of the m index positions of the spindle drum the further contacts of the fixed part engage the further contacts of the rotatable part respectively.

9. A multi spindle lathe as claimed in claim 1 wherein said fixed and rotatable parts of the rotary switch each have a central contact, said central contacts cooperating to provide a common electrical return to at least some of the electrical circuits.

10. A multi spindle lathe as claimed in claim 1 wherein m is equal to n and at least two of said electrical circuits are associated with each of the spindles.

11. A multi spindle lathe as claimed in claim 1, further comprising wiring connected to the contacts in the rotatable part of the switch, and a tube which is connected to the drum to be indexed therewith, said wiring extending to the drum through said tube.

12. A multi spindle lathe as claimed in claim 1, where the rotatable part of the switch is rigidly connected to the drum and the switch axis is coincident with the spindle axis.

13. A multi spindle lathe comprising:
a machine base;
a spindle drum mounted on the machine base;
drive means for indexing the spindle drum with respect to the machine base about an index axis in equal steps of $m/360°$, where $m$ is a finite integer greater than unity, whereby the spindle drum is brought in succession into $m$ different index positions;
$m$ spindles, mounted in the spindle drum and defining respective spindle axes which are spaced equiangularly about the spindle axis and are all in the same orientation with respect to the spindle axis;
a plurality of electrical circuits associated with the spindle drum; and
a multi pole rotary electrical switch for controlling said electrical circuits and having a part which is fixed with respect to the machine base and a part which is rotatable with respect to the machine base about a switch axis and is arranged to index about said switch axis in synchronism with the spindle drum, whereby the second part is brought in succession into $m$ different index positions about said switch axis, the fixed and rotatable parts each having m.p cooperable contacts thereon, where p is a finite integer greater than unity, said contacts being arranged in each of the fixed and rotatable parts in p circular arrays which are centered on the switch axis and which are all of substantially the same diameter, each array being made up of $m$ equiangularly spaced contacts so that at each of the $m$ index positions of the spindle drum the contacts of the fixed part engage respective contacts of the rotatable part for controlling the electrical circuits respectively.

14. A multi spindle lathe as claimed in claim 13 in which said fixed and rotatable parts of the rotary switch each have $m$ further cooperable contacts thereon, said further contacts being arranged in the fixed and rotatable parts in respective circular arrays of different diameter from the circular arrays formed by said m.p cooperable contacts, the contacts of each circular array of further contacts being spaced equiangularly about said switch axis so that at each of the $m$ index positions of the spindle drum the further contacts of the fixed part engage the further contacts of the rotatable part respectively.

* * * * *